United States Patent
Hillan

(10) Patent No.: US 9,887,743 B2
(45) Date of Patent: Feb. 6, 2018

(54) METHODS AND APPARATUS FOR DISCOVERING TAG TALKS FIRST DEVICES

(71) Applicant: QUALCOMM Incorporated, San Diego, CA (US)

(72) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 13/786,876

(22) Filed: Mar. 6, 2013

(65) Prior Publication Data
US 2014/0120833 A1    May 1, 2014

Related U.S. Application Data

(60) Provisional application No. 61/719,725, filed on Oct. 29, 2012.

(51) Int. Cl.
| | | |
|---|---|---|
| H04B 5/00 | (2006.01) | |
| H04B 5/02 | (2006.01) | |
| G06K 7/10 | (2006.01) | |

(52) U.S. Cl.
CPC ........... *H04B 5/02* (2013.01); *G06K 7/10297* (2013.01); *H04B 5/0031* (2013.01)

(58) Field of Classification Search
CPC ................................ H04B 5/0031; H04B 5/02
(Continued)

(56) References Cited

U.S. PATENT DOCUMENTS

| | | |
|---|---|---|
| 8,249,500 B2 | 8/2012 | Wilson |
| 9,240,824 B2 | 1/2016 | Hillan et al. |

(Continued)

FOREIGN PATENT DOCUMENTS

| | | |
|---|---|---|
| CN | 102668397 A | 9/2012 |
| CN | 102710299 A | 10/2012 |

(Continued)

OTHER PUBLICATIONS

Eeden, H.V., et al., "Reader Talks First vs. 'Tag Talks First' (RTF/TTF) RFID protocols; white paper", Internet Citation, Aug. 26, 2002 (Aug. 26, 2002), XP002394561, Retrieved from the Internet: URL:http://www.ipico.co.za/technology/Whitepapers/TTF%20white%20paper%20v5.pdf [retrieved on Aug. 11, 2006], sections 2 and 4.
International Search Report and Written Opinion—PCT/US2013/066972—ISA/EPO—Feb. 7, 2014.

*Primary Examiner* — Raj Chakraborty
(74) *Attorney, Agent, or Firm* — Joseph S. Hanasz

(57) ABSTRACT

A method, an apparatus, and a computer program product for wireless communication are provided in connection with enabling a NFC-enabled device to discover and/or communicate with a TTF device. In one example, a NFC enabled device is equipped to initiate a RF field that is not modulated by the NFC-enabled device as part of a technology detection process, monitor the RF field for at least a portion of a wait duration, determine whether, during the wait duration, the RF field is modulated in a manner consistent with modulation characteristics of a NFC technology, and terminate the technology detection process upon the determination that the RF field is modulated a manner consistent with modulation characteristics of the NFC technology.

36 Claims, 8 Drawing Sheets

(58) Field of Classification Search
USPC .......................................................... 455/41.1
See application file for complete search history.

(56) References Cited

U.S. PATENT DOCUMENTS

| | | | |
|---|---|---|---|
| 2006/0245402 A1* | 11/2006 | Fujii | H04B 5/0056 370/338 |
| 2008/0174436 A1* | 7/2008 | Landt | G06K 19/0704 340/572.7 |
| 2009/0045913 A1* | 2/2009 | Nelson | G06K 7/0008 340/5.66 |
| 2011/0022755 A1* | 1/2011 | Sueyoshi | H04B 5/0031 710/109 |
| 2011/0076941 A1 | 3/2011 | Taveau et al. | |
| 2012/0038464 A1 | 2/2012 | Stromberger | |
| 2012/0045989 A1 | 2/2012 | Suumaeki et al. | |
| 2012/0196529 A1 | 8/2012 | Huomo et al. | |
| 2012/0214411 A1 | 8/2012 | Levy | |
| 2013/0005242 A1* | 1/2013 | Royston | G06K 7/10138 455/41.1 |

FOREIGN PATENT DOCUMENTS

| | | |
|---|---|---|
| DE | 102009054296 A1 | 5/2011 |
| EP | 2226950 A2 | 9/2010 |
| WO | 2010093969 A2 | 8/2010 |
| WO | WO-2011128216 A1 | 10/2011 |

* cited by examiner

METHODS AND APPARATUS FOR DISCOVERING TAG TALKS FIRST DEVICES

CLAIM OF PRIORITY UNDER 35 U.S.C. §119

The present Application for Patent claims priority to Provisional Application No. 61/719,725 entitled "METHODS AND APPARATUS FOR DISCOVERING TAG TALKS FIRST DEVICES" filed Oct. 29, 2012, and assigned to the assignee hereof and hereby expressly incorporated by reference herein.

BACKGROUND

The disclosed aspects relate generally to communications between and/or within devices and specifically to methods and systems for extending the capability of a near field communication (NFC) device to discover Tag Talks First (TTF) devices.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, NFC, etc.

Currently, NFC Forum specifications only define mechanisms to communicate with remote NFC devices (e.g., tags) that wait for a command before communicating with a polling NFC-enabled device. Additionally, there is a class of NFC-enabled devices called "Tag Talks First" (TTF) devices. A TTF device, once exposed to a suitable radio frequency (RF) field, starts to transmit data without waiting for a command from the device that has created the RF field. As such, where a polling NFC-enabled device is configured to use current NFC Forum specifications, the presence of a TTF device in an operating volume would either be recognized as interference or not recognized at all.

Thus, improved apparatus and methods for enabling a NFC-enabled device to discover and/or communicate with a TTF device are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling a NFC-enabled device to discover and/or communicate with a TTF device. In one example, a NFC-enabled device is equipped to initiate a RF field that is not modulated by the NFC-enabled device as part of a technology detection process, monitor the RF field for at least a portion of a wait duration, determine whether, during the wait duration, the RF field is modulated in a manner consistent with modulation characteristics of a NFC technology, and terminating the technology detection process upon the determination that the RF field is modulated a manner consistent with modulation characteristics of the NFC technology.

According to related aspects, a method for enabling a NFC-enabled device to discover and/or communicate with a TTF device is provided. The method can include initiating, at a NFC-enabled device, a RF field that is not modulated by the NFC-enabled device as part of a technology detection process. Further, the method can include monitoring the RF field for at least a portion of a wait duration. Further, the method can include determining whether, during the wait duration, the RF field is modulated in a manner consistent with modulation characteristics of a NFC technology. Moreover, the method may include terminating the technology detection process upon the determination that the RF field is modulated a manner consistent with modulation characteristics of the NFC technology.

Another aspect relates to a communications apparatus enabled to discover and/or communicate with a TTF device. The communications apparatus can include means for initiating, at a NFC-enabled device, a RF field that is not modulated by the NFC-enabled device as part of a technology detection process. Further, the communications apparatus can include means for monitoring the RF field for at least a portion of a wait duration. Further, the communications apparatus can include means for determining whether, during the wait duration, the RF field is modulated in a manner consistent with modulation characteristics of a NFC technology. Moreover, the communications apparatus can include means for terminating the technology detection process upon the determination that the RF field is modulated a manner consistent with modulation characteristics of the NFC technology.

Another aspect relates to a communications apparatus. The apparatus can include a transceiver configured to receive data, a memory, a NFC technology detection module coupled to at least one of the memory or the processor and configured to initiate a radio frequency (RF) field that is not modulated by the NFC-enabled device as part of a technology detection process, monitor the RF field for at least a portion of a wait duration, determine whether, during the wait duration, the RF field is modulated in a manner consistent with modulation characteristics of a NFC technology, and terminate the technology detection process upon the determination that the RF field is modulated a manner consistent with modulation characteristics of the NFC technology.

Still another aspect relates to a computer program product, which can have a computer-readable medium including code for initiating, at a NFC-enabled device, a RF field that is not modulated by the NFC-enabled device as part of a technology detection process. Further, the computer-readable medium may include code for monitoring the RF field for at least a portion of a wait duration. Further, the computer-readable medium may include code for determining whether, during the wait duration, the RF field is modulated in a manner consistent with modulation characteristics of a NFC technology. Moreover, the computer-readable medium can include code for terminating the technology detection process upon the determination that the RF field is modulated a manner consistent with modulation characteristics of the NFC technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, as defined in the NFC Forum Activity specification, during Technology Detection (TD), a NFC-enabled device may poll for and/or react to responses from remote NFC devices. Prior to each initial poll command, the NFC-enabled device may maintain a suitable RF field for a specified minimum guard time. Conventional tags exposed to this field may wait for a command from the polling NFC-enabled device prior to responding. By contrast, a TTF device may not wait for a command from the NFC-enabled device prior to commencing transmissions. As described in further detail herein, the polling NFC-enabled device may also listen for an incoming frame during the guard time, thereby allowing it to detect a TTF device. In an aspect, the NFC-enabled device may be enabled to listen during the guard time through setting of one or more parameters. In another aspect, depending at least in part on the characteristics of TTF device(s) of interest, the guard time might be extended to allow for the polling NFC-enabled device to detect the initial transmission from the TTF device. In an operational aspect, if, during a wait duration (e.g., guard time), at least a portion of a frame is received by the polling NFC-enabled device, then the polling NFC-enabled device may choose to stop the TD process and notify the adjacent upper layer that the frame has been received. In such an aspect, the adjacent upper layer may pass the frame to an application (e.g., a registered listener) for processing. Thereafter, the NFC-enabled device, may decide to reconfigure or to terminate the TD process. In another operational aspect, if no frame is received by the end of the wait duration, the polling NFC-enabled device may proceed with polling for conventional remote NFC devices as defined in the current NFC Forum Activity specification.

Figure 1:
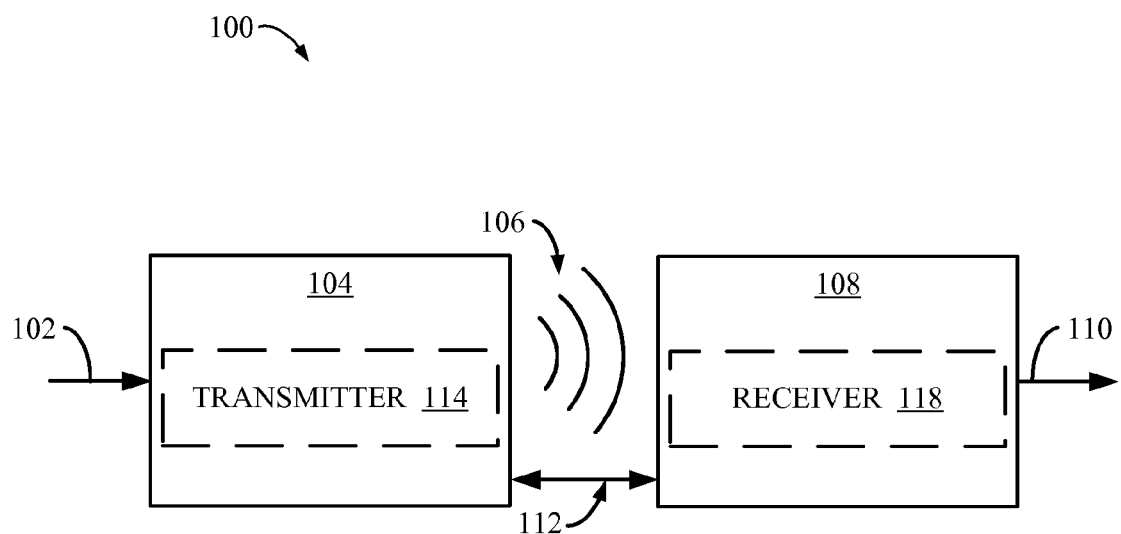
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
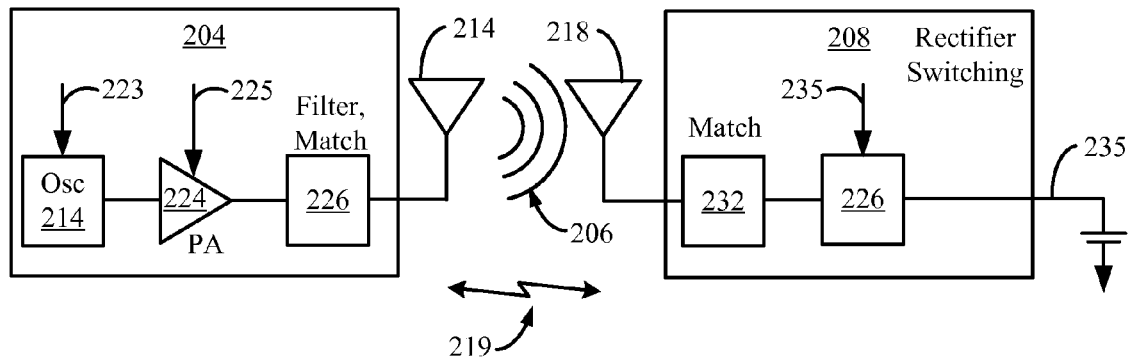
FIG. 2 is a schematic diagram of a wireless communication system, according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
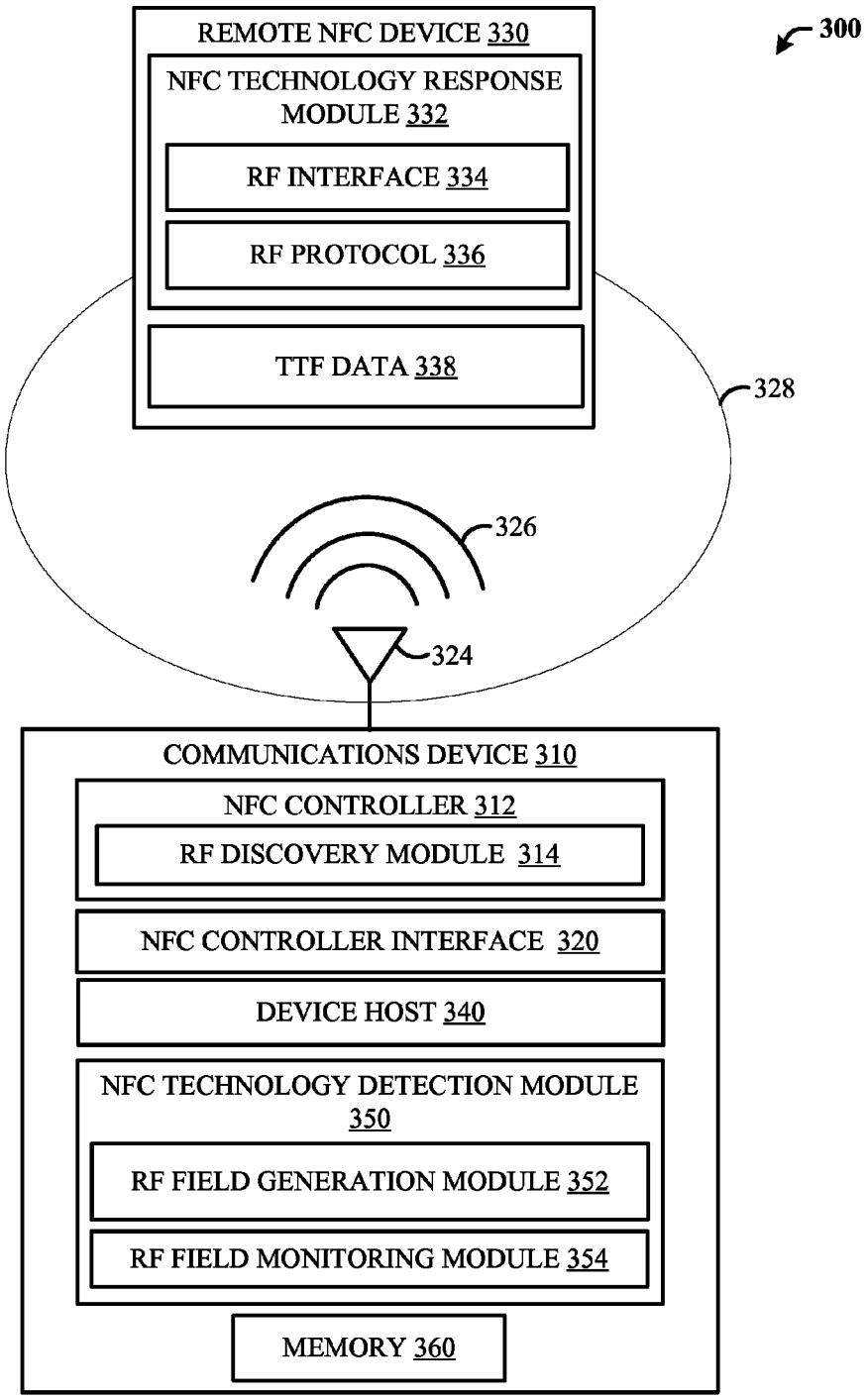
FIG. 3 is a block diagram of a NFC environment, according to an aspect.

With reference to FIG. 3, a block diagram of a communication network 300 according to an aspect is illustrated. Communication network 300 may include communications devices 310 which, through antenna 324, may communicate with a remote NFC device 330 that is within an operating volume 328. Communications device 310 may use one or more NFC RF technologies 326 (e.g., NFC-A, NFC-B, NFC-F, etc.). In an aspect, communications device 310 may use NFC technology detection module 350 to poll the operating volume 328 to attempt to detect the presence of and identify a remote NFC device 330. In an aspect, a remote NFC device (e.g., a tag, a card, a peer target, etc.) may be configured to communicate in response to the presence of a RF field. For example, the remote NFC device 330 may be a TTF device. In an aspect, remote NFC device 330 may be but is not limited to a tag, a reader/writer device, a peer initiator device, a remote peer target device, etc.

Communications device 310 may include NCI 320. In an aspect, NCI 320 may be configurable to enable communications between a device host (DH) 340 and NFC controller 312.

Communications device 310 may include a NFC controller (NFCC) 312. In an aspect, NFCC 312 may include RF discovery module 314. RF discovery module 314 may be configurable to perform RF discovery using a discovery process. One aspect of the discovery process may include polling for the presence of a remote NFC device. DH 340 may be configurable to generate a command to prompt NFCC 312 to perform various functions associated with RF discovery.

Communications device 310 may include NFC technology detection module 350. NFC technology detection module 350 may be configurable to detect the presence of and/or receive data from a remote NFC device 330 within the operating volume 328. NFC technology detection module 350 may include RF field generation module 352 and RF field monitoring module 354. In an aspect, RF field generation module 352 may be configured to generate an unmodulated RF field in the operating volume 328 for a wait duration. In an aspect, the wait duration may be defined as a guard time defined in the NFC forum specification. In another aspect, RF field generation module 352 may generate the unmodulated RF field for a wait duration defined by a TTF device. In still another aspect, the wait duration may be selected to be a longer duration of the NFC Forum defined guard time and a TTF device defined duration. In response to the generated RF field, the remote NFC device 330 may send TTF data 338. As used herein, TTF data may refer to any content available from a TTF device and where such content may be transmitted in response to the presence of a RF field, rather than waiting for a command to transmit. In another aspect, RF field monitoring module 354 may be configured to monitor the generated RF field for any load modulations that may be consistent with modulation characteristics of a NFC technology. In an aspect, the NFC technology may be NFC type-A RF technology, NFC type-B RF technology, NFC type-F RF technology. In an aspect, a NFC technology type that RF field monitoring module 354 monitors may be based on which NFC technology type the communications device 310 intends to use during subsequent communications in the technology detection process. In another aspect, RF field monitoring module 354 may be configured to monitor for RF field modulations indicative of multiple NFC technology types. In another aspect, RF field monitoring module 354 may determine the RF field is being modulated once the load modulation increases above a threshold level. In an operational aspect, when RF field monitoring module 354 determines that there RF field modulations consistent with modulation characteristics of a NFC technology, then NFC technology detection module 350 may terminate the technology detection process. Further, NFC technology detection module 350 may receive TTF data 338 and communicate the TTF data 338 to one or more applications of interest. In an aspect, NFC technology detection module 350 may communicate the received TTF data 338 by notifying an adjacent upper layer that the TTF data 338 (e.g., a frame) has been received. In another operational aspect, where RF field monitoring module 354 does not detect any RF field modulations during the wait duration, then NFC technology detection module 350 may continue with the technology detection process. Although FIG. 3 depicts NFC technology detection module 350 is a separate module, one of ordinary skill in the art would appreciate that the functionality associated with NFC technology detection module 350 may be included within one or more components, such as but not limited to, NFCC 312, DH 340, etc.

Communications device 310 may include further include memory 360 that may be configurable to store received data and/or make received data available to one or more applications associated with the communications device 310.

Accordingly, a system and method is disclosed to for discovery of and/or communication with TTF devices.

Figure 4:
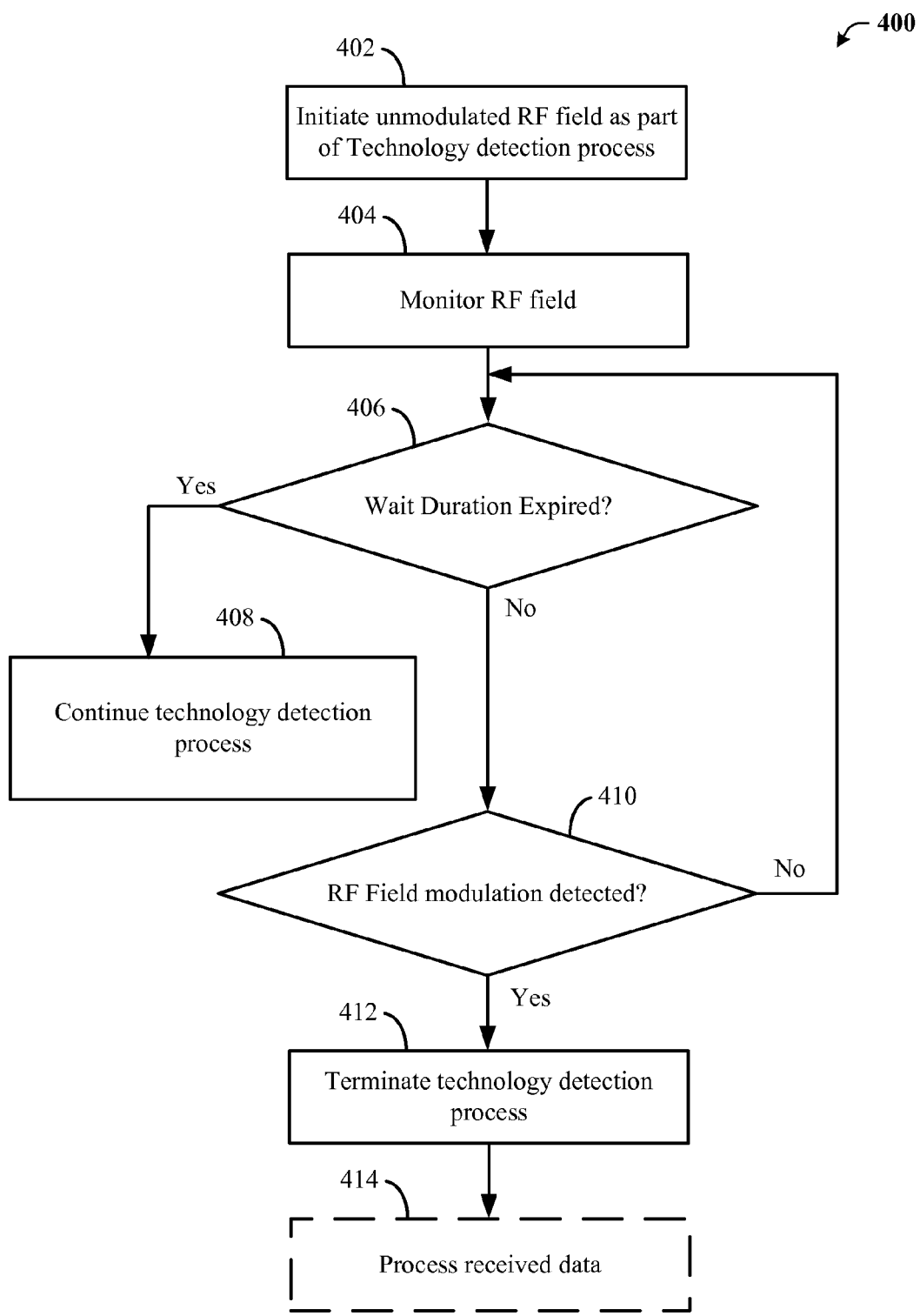
FIG. 4 is a flowchart describing an example for discovering a TTF device, according to an aspect.
Figure 5:
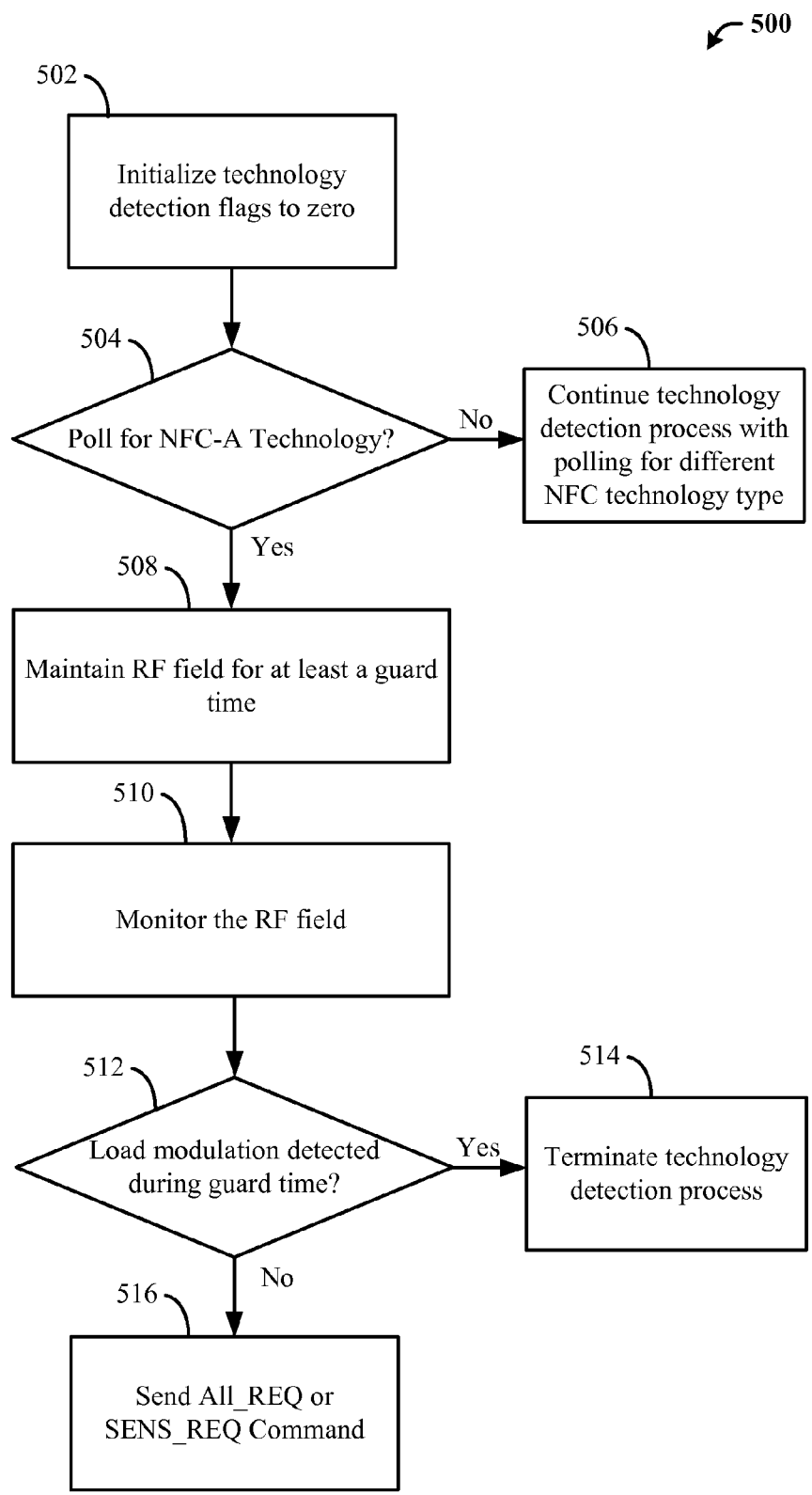
FIG. 5 is a flowchart describing an example for performing a technology detection process, according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts an example flowchart describing a process 400 for enabling a NFC-enabled device to discover and/or communicate with a TTF device.

At block 402, a NFC-enabled device may initiate a RF field that is not modulated by the NFC-enabled device as part of a technology detection process.

At block 404, the NFC-enabled device may monitor the RF field for at least a portion of a wait duration. In an aspect, the wait duration may be a guard time defined as part of the technology detection process. In an aspect where the NFC-enabled device is configured to detect a TTF device, the wait duration may be a TTF device defined duration. In another aspect, the wait duration may be selected as a longer duration of a guard time defined as part of the technology detection process, or a TTF device defined duration.

At block 406, the NFC-enabled device determines whether the wait duration has expired. If at block 406, the NFC-enabled device determines that the wait duration has expired, then at block 408, the technology detection process may continue. In such an aspect, the determination may further include receiving of at least a portion of a data frame during the wait duration, and at optional block 414, processing the received data frame and/or notifying an upper layer of the received data.

By contrast, if at block 406, the NFC-enabled device determines that the wait duration has not expired, then at block 410, the NFC-enabled device determines whether a load modulation indicative of a NFC technology is detected. In an aspect, the RF field may be determined to be modulated when a load modulate above a threshold is detected. In another aspect, the RF field may be modulated due to the presence of a TTF device in the NFC-enabled device operating volume.

If at block 410, the NFC-enabled device determines that no relevant load modulation has been detected, then the process 400 may return to block 406.

By contrast, if at block 410, the NFC-enabled device determines that a load modulation indicative of a NFC technology is detected, then at block 412, the technology detection process may be terminated.

FIG. 5 depicts an example flowchart describing another process 500 for performing technology detection, according to an aspect.

At block 502, a NFC-enabled device may initialize technology detection flags to zero. In such an aspect, the technology detection flags may be FOUND_A, FOUND_B, FOUND_F.

At block 504, the NFC-enabled device may determine whether it is configured to poll for NFC-A technology (e.g., CON_POLL_A=1). If at block 504, the NFC-enabled device is determined not to be configured to poll for NFC A, then at block 506 the technology detection process may continue for a NFC technology type for which the NFC-enabled device is configured to poll.

By contrast, if at block 504, the NFC-enabled device determines that that it is configured to poll for NFC-A, then at block 508, the NFC-enabled device may maintain the RF field for at least a wait duration (e.g., guard time (GT)). In an aspect, the wait duration is a NFC technology type specific time (e.g., $GT_A$). In another aspect, the wait duration may be configured to be a duration defined by a TTF device. In still another aspect, the wait duration may be a longer time of $GT_A$ and the TTF device defined duration.

At block 510, the NFC-enabled device may monitor the RF field for the wait duration.

At block 512, the NFC-enabled device determines whether a load modulation indicative of the presence of a remote NFC device (e.g., TTF device) is detected within the guard time. In an aspect, the load modulation may be above a threshold value prior to be considered relevant.

If at block 512, the NFC-enabled device determines that a load modulation indicative of the presence of a remote NFC device is detected within the wait duration, then at block 514, the NFC-enabled device may terminate the technology detection process.

By contrast, if at block 512, the NFC-enabled device determines that no relevant load modulation was detected in the RF field during the wait duration, then at block 516, the NFC-enabled device may send an ALL_REQ command or a SENS_REQ command and may wait for a response.

Figure 6:
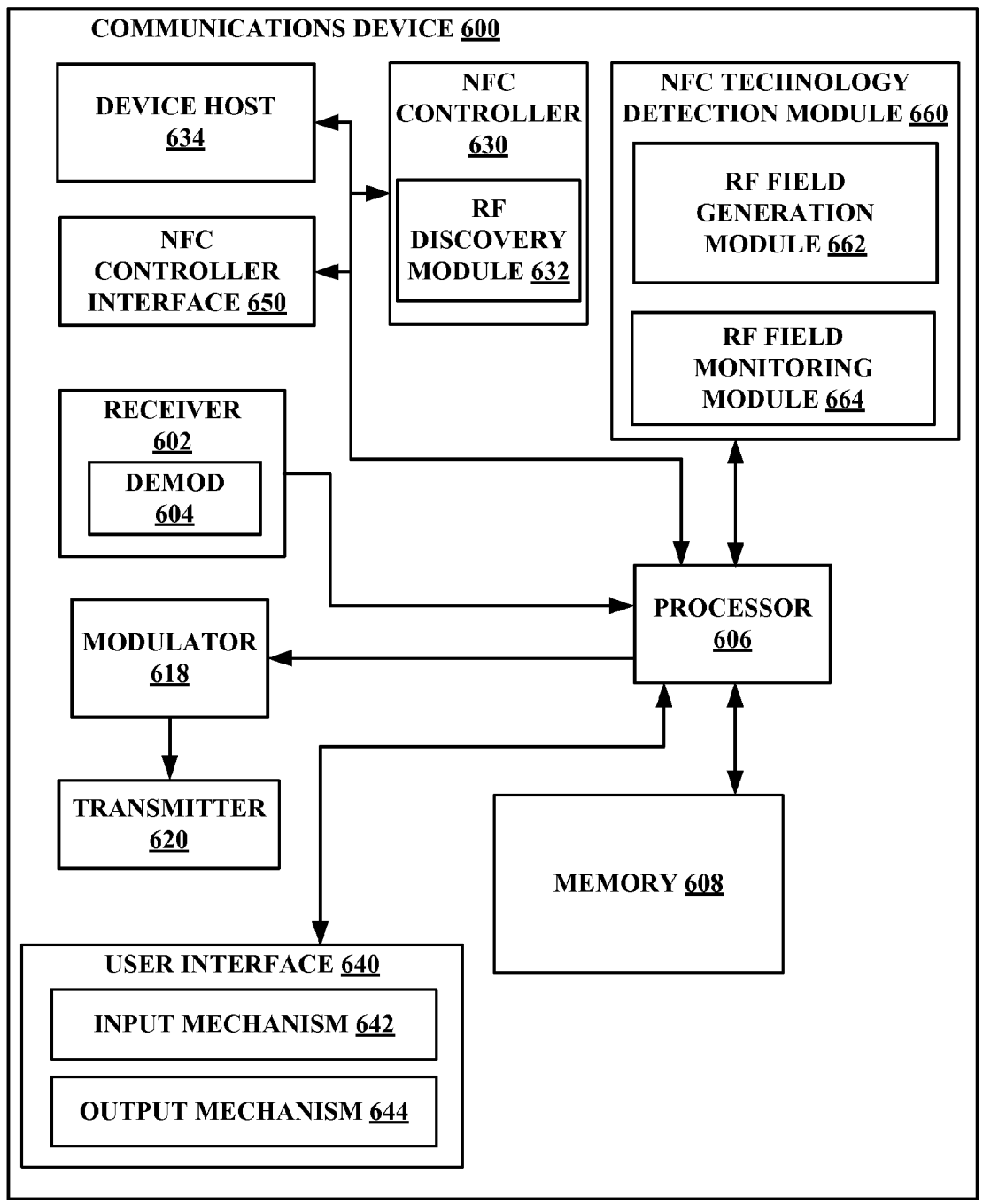
FIG. 6 is a block diagram example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC based communications.

Further, processor 606, device host 634, NFCC 630, and/or NFC technology detection module 660 can provide means for initiating a RF field that is not modulated by the NFC-enabled device as part of a technology detection process, means for monitoring the RF field for at least a portion of a wait duration, means for determining whether, during the wait duration, the RF field is modulated in a manner consistent with modulation characteristics of a NFC technology, and means for terminating the technology detection process upon the determination that the RF field is modulated a manner consistent with modulation characteristics of the NFC technology.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include a NFC controller 630 and device host 634. In an aspect, NFCC 630 may include RF discovery module 632. RF discovery module 632 may be configurable to perform a discovery process. One aspect of the discovery process may include polling for the presence of one or more remote NFC devices. DH 634 may be configurable to generate a command to prompt NFCC 630 to perform various functions associated with RF discovery.

In another aspect, communications device 600 may include NCI 650. In an aspect, NCI 650 may be configurable to enable communications between a NFC controller 630 and DH 634. NCI 650 may be configurable to function in a listening mode and/or a polling mode.

In another aspect, communications device 600 may include NFC technology detection module 660. NFC technology detection module 660 may be configurable to detect the presence of and/or receive data from a remote NFC device within the operating volume. NFC technology detection module 660 may include unmodulated RF field generation module 662 and RF field monitoring module 664. In an aspect, unmodulated RF field generation module 662 may be configured to generate an unmodulated RF field in the operating volume for a wait duration. In an aspect, the wait duration may be defined as a guard time defined in the NFC forum specification. In another aspect, unmodulated RF field generation module 662 may generate the unmodulated RF field for a wait duration defined by a TTF device. In still another aspect, the wait duration may be selected to be a longer duration of the NFC Forum defined guard time and a TTF device defined duration. In response to the generated RF field, the remote NFC device may send TTF data. In another aspect, RF field monitoring module 664 may be configured to monitor the generated RF field for any load modulations that may be consistent with modulation characteristics of a NFC technology. In an aspect, the NFC technology may be NFC type-A RF technology, NFC type-B RF technology, NFC type-F RF technology, etc. In an aspect, a NFC technology type that RF field monitoring module 664 monitors may be based on which NFC technology type the communications device 600 intends to use during subsequent communications in the technology detection process. In another aspect, RF field monitoring module 664 may be configured to monitor for RF field modulations indicative of multiple NFC technology types. In another aspect, RF field monitoring module 664 may determine the RF field is being modulated once the load modulation increases above a threshold level. In an operational aspect, when RF field monitoring module 664 determines that there RF field modulations consistent with modulation characteristics of a NFC technology, then technology detection module 660 may terminate the technology detection process. Further, technology detection module 660 may receive data and communicate the data to one or more applications of interest. In an aspect, technology detection module 660 may communicate the received data by notifying an adjacent upper layer that the data (e.g., a frame) has been received. In another operational aspect, where RF field monitoring module 664 does not detect any RF field modulations during the wait duration, then technology detection module 660 may continue with the technology detection process.

Although FIG. 6 detects NFC technology detection module 660 is a separate module, one of ordinary skill in the art would appreciate that the functionality associated with NFC technology detection module 660 may be included within one or more components, such as but not limited to, NFCC 630, DH 634, etc. In another aspect, NFC technology detection module 660 configurable to enable communication with TTF devices as described with respect to FIGS. 4-5.

Additionally, communications device 600 may include user interface 640. User interface 640 may include input mechanisms 642 for generating inputs into communications device 600, and output mechanism 644 for generating information for consumption by the user of the communications device 600. For example, input mechanisms 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display configurable to present media content that is in image or video format or an audio speaker to present media content that is in an audio format.

Figure 7:
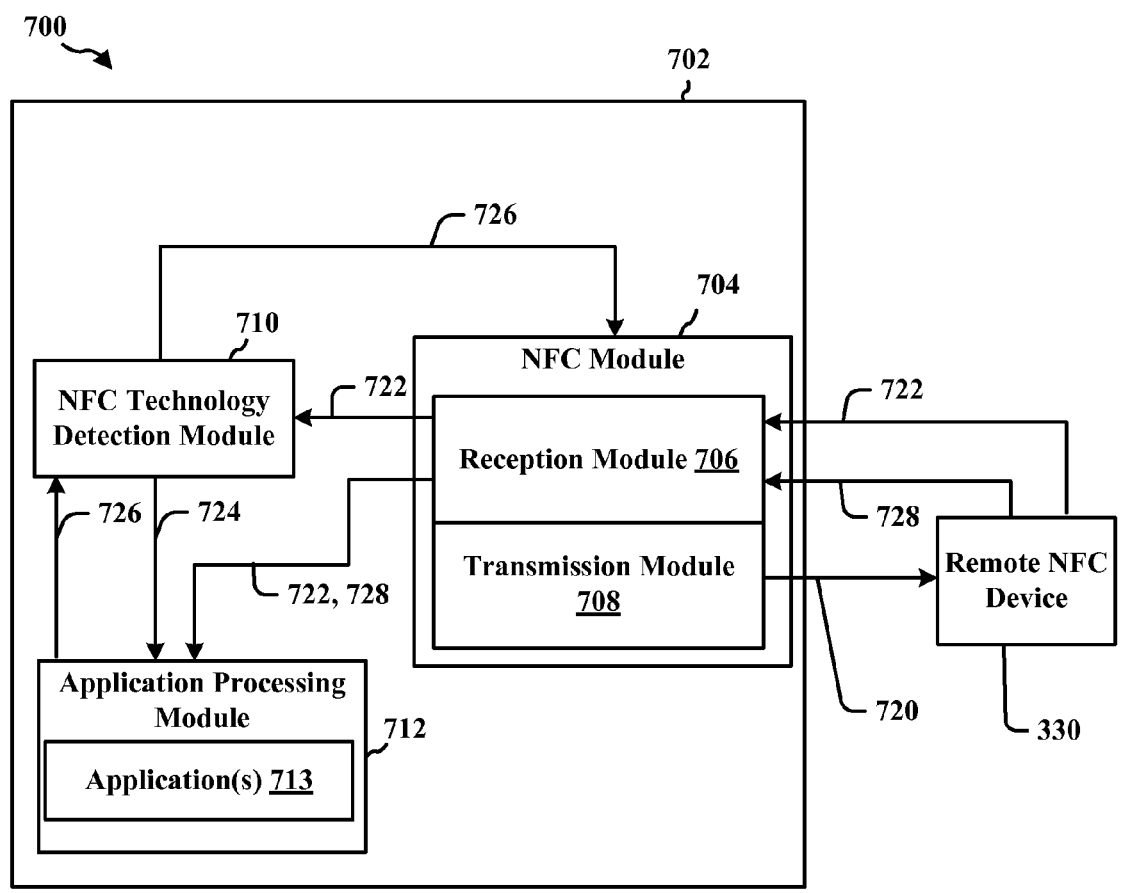
FIG. 7 is a conceptual data flow diagram illustrating the data flow between different modules/means/components in an example apparatus.

FIG. 7 is a conceptual data flow diagram 700 illustrating the data flow between different modules/means/components in an exemplary apparatus 702. The apparatus may be a wireless device (e.g., communications device 600, etc.). The apparatus includes a NFC module 704 with a reception module 706 and a transmission module 708, a NFC technology detection module 710, and an application processing module 712.

In an operational aspect, apparatus 702 (e.g., communications device 600), through NFC module 704 and transmission module 708, may initiate a RF field 720 as part of a technology detection process. In an aspect, the NFC-enabled device may not modulate the RF field 720 for a wait duration. The RF field 720 may be modulated by a remote NFC device 330 in an operating volume. NFC module 704 reception module 706 may monitor the RF field 720 for at least a portion of a wait duration. In an aspect, the RF field may be determined to be modulated when a load associated with the modulation characteristics of the NFC technology is above a threshold. In an aspect n which the apparatus 702 is configured to detect a TTF device, the wait duration may be a TTF device defined duration. In another aspect, the wait duration may be a guard time defined as part of the technology detection process. In still another aspect, the wait duration may be selected as a longer duration of either a guard time defined as part of the technology detection process, a TTF device defined duration, etc.

NFC module 704 reception module 706 may detect a modulation 722 in the RF field and provide the detected modulation 722 to NFC technology detection module 710. NFC technology detection module 710 may determine whether, during the wait duration, the RF field is modulated 722 in a manner consistent with modulation characteristics of a NFC technology (e.g., originating from a remote NFC device 330). In an aspect, the RF field may be modulated by a TTF device. In an aspect, the NFC technology may be based on NFC type-A, NFC type-B, NFC type-F, etc. In an aspect in which the RF field is modulated 722 by a TTF device, the apparatus may receive, via reception module 706, data 724, process the data 724, and notifying an upper layer (e.g., application 713) of the data 724.

In an aspect, NFC technology detection module 710 may determine that the RF field is modulated 722 in a manner consistent with modulation characteristics of a NFC technology, and may provide a termination message 726 to the NFC module 704 prompting the NFC module 704 to terminate the technology detection process. In an aspect, the determination process may be performed at a higher layer (e.g., application processing module 712 and/or one or more applications 713) and the termination message 726 may be provided to the NFC module 704 in response to the higher layer determination.

Additionally or in the alternative, NFC technology detection module 710 may determine that the RF field is not modulated 722 in a manner consistent with modulation characteristics of a NFC technology, and may continue the technology detection process upon expiration of the wait duration. In another aspect, NFC technology detection module 710 may continue the technology detection process upon a determination that the RF field is not modulated in a manner consistent with modulation characteristics of the NFC technology, and upon expiration of the wait duration In an optional operational aspect, an application 713 associated with application processing module 712 may process data 728 received from a remote NFC device 330. In an aspect, NFC module 704, through reception module 706, may receive data 728 from a remote NFC device 330 using a NFC RF-technology (e.g., NFC-A, NFC-B, NFC-F) determined by NFC technology detection module 710. In another aspect, application 713 may transmit, via NFC module 704 and transmission module 708, information to the remote NFC device 330 once the NFC technology detection module 710 has determined the NFC RF-technology used by the remote NFC device 330.

The apparatus may include additional modules that perform each of the steps of the algorithm in the aforementioned call flows and/or flow chart of FIGS. 4 and 5. As such, each step in the aforementioned FIGS. 4 and 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
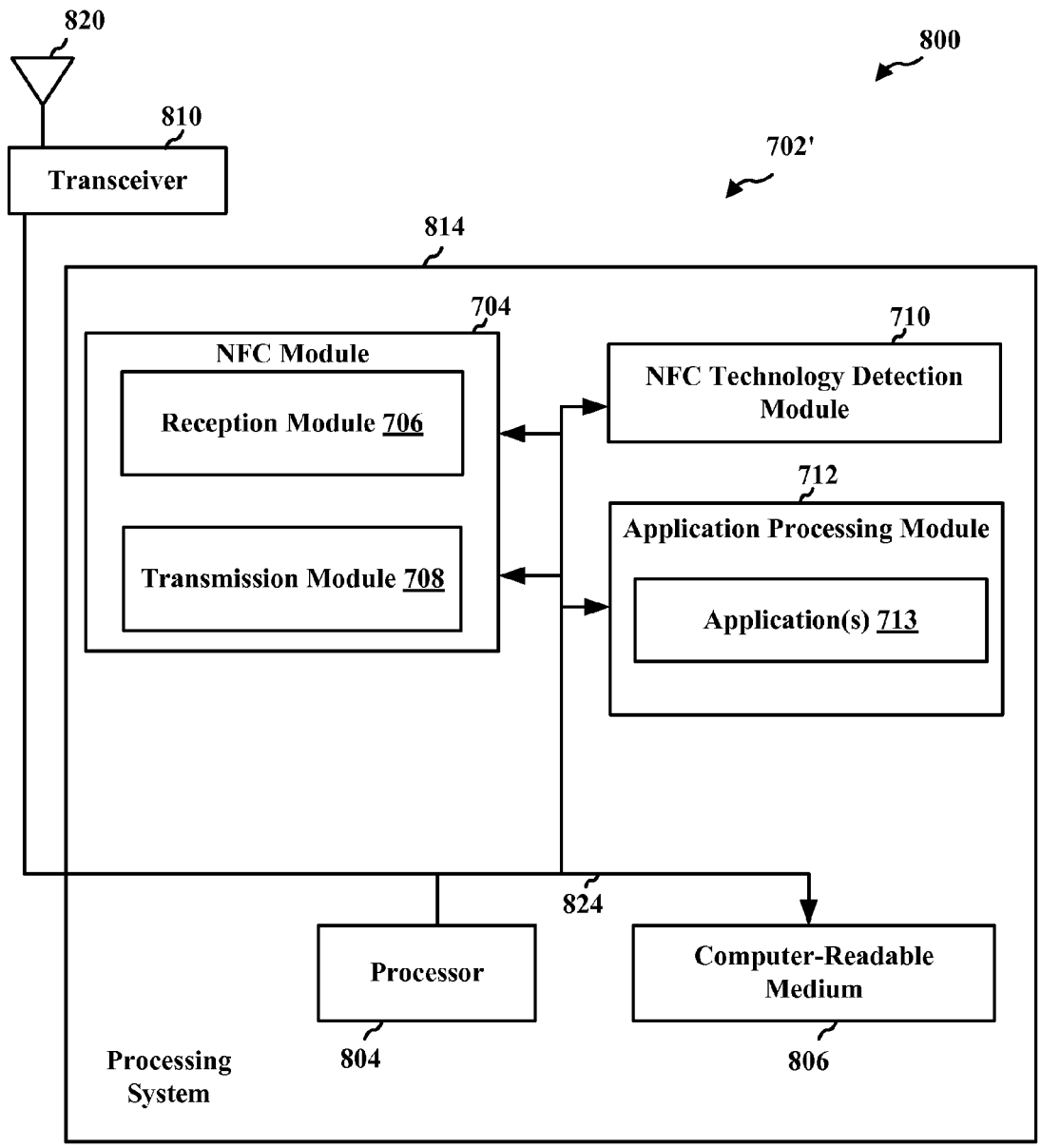
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 704, 706, 708, 710, 712, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes at least one of the modules 704, 706, 708, 710, and 712. The modules may be software modules running in the processor 804, resident/stored in the computer-readable medium 806, one or more hardware modules coupled to the processor 804, or some combination thereof. In an aspect, the processing system 814 may be a component of the communications device 600 and may include the memory 610 and/or at least one of the processor 606, device host 634, NFC controller 630, and NFC technology detection module.

In one configuration, the apparatus 702/702' for wireless communication includes means for initiating, at a NFC-enabled device, a RF field that is not modulated by the NFC-enabled device as part of a technology detection process, means for monitoring the RF field for at least a portion of a wait duration, means for determining whether, during the wait duration, the RF field is modulated in a manner consistent with modulation characteristics of a NFC technology, and means for terminating the technology detection process upon the determination that the RF field is modulated a manner consistent with modulation characteristics of the NFC technology. In an aspect, apparatus 702/702' may further include means for continuing the technology detection process upon expiration of the wait duration. In an aspect, the apparatus 702/702' means for continuing may be configured to continue the technology detection process upon a determination that the RF field is not modulated in a manner consistent with modulation characteristics of the NFC technology, and upon expiration of the wait duration. In an aspect, apparatus 702/702' means for determining may be further configured to receive data wherein at least a portion of the data is received prior to expiration of the wait duration, process the data, and notify an upper layer of the data.

In another configuration, the apparatus 702/702' for wireless communication includes means for receiving, from a writer application, a complete NDEF message that includes a NDEF header and data and is intended to be written on a remote NFC device, means for determining, based on one or more contextual factors, that the remote NFC device is configured to receive a modified version of the complete NDEF message, and means for generating the modified version of the complete NDEF message by removing at least a portion of the NDEF header from the complete NDEF message. In an aspect, apparatus 702/702' may further include means for transmitting the modified version of the complete NDEF message to the remote NFC device. In an aspect, apparatus 702/702' means for generating may be further configured to remove at least a portion of a NDEF header from the complete NDEF message.

As described supra, the processing system 814 may include the processor 606, device host 634, NFC Controller 630 and/or NFC technology detection module 660. As such, in one configuration, the aforementioned means may be the processor 606, device host 634, NFC Controller 630 and/or NFC technology detection module 660 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL)

station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, NFC technology types (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configurable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
generating, at a near field communication (NFC)-enabled device, a radio frequency (RF) field that is not modulated by the NFC-enabled device during a wait duration as part of a technology detection process;
while generating the RF field that is not modulated and before generating a polling command, monitoring, by the NFC-enabled device, the generated RF field during the wait duration to detect RF field modulations received in response to the generated RF field that is not modulated;
determining whether, during the wait duration, any RF field modulations consistent with modulation characteristics of a NFC technology are detected;
terminating the technology detection process after an end of the wait duration; and
after terminating the technology detection process, generating the polling command in response to no RF field modulation consistent with modulation characteristics of the NFC technology having been detected during the wait duration.

2. The method of claim 1, further comprising:
continuing the technology detection process upon expiration of the wait duration.

3. The method of claim 1, further comprising:
continuing the technology detection process upon a determination that no RF field modulations consistent with modulation characteristics of the NFC technology are detected, and upon expiration of the wait duration.

4. The method of claim 1, wherein the RF field is modulated by a tag talks first (TTF) device.

5. The method of claim 4, wherein the NFC-enabled device is configured to detect the TTF device, and wherein the wait duration is a TTF device defined duration.

6. The method of claim 1, wherein the wait duration is a guard time defined as part of the technology detection process.

7. The method of claim 1, wherein the wait duration is selected as a longer duration of either a guard time defined as part of the technology detection process, or a TTF device defined duration.

8. The method of claim 1, wherein the RF field is determined to be modulated when a load associated with the modulation characteristics of the NFC technology is above a threshold.

9. The method of claim 1, wherein the determining further comprises:
receiving data wherein at least a portion of the data is received prior to expiration of the wait duration;
processing the data; and
notifying an upper layer of the data.

10. A computer program product, comprising:
a non-transitory computer-readable medium comprising code for:
generating, at a near field communication (NFC)-enabled device during a wait duration, a radio frequency (RF) field that is not modulated by the NFC-enabled device as part of a technology detection process;
while generating the RF field that is not modulated and before generating a polling command, monitoring the generated RF field during the wait duration to detect RF field modulations received in response to the generated RF field that is not modulated;
determining whether, during the wait duration, any RF field modulations consistent with modulation characteristics of a NFC technology are detected;
terminating the technology detection process after an end of the wait duration; and
after terminating the technology detection process, generating the polling command in response to no RF field modulation consistent with modulation characteristics of the NFC technology having been detected during the wait duration.

11. The computer program product of claim 10, wherein the computer-readable medium further comprise code for:
continuing the technology detection process upon expiration of the wait duration.

12. The computer program product of claim 10, wherein the computer-readable medium further comprise code for:
continuing the technology detection process upon a determination that no RF field modulations consistent with modulation characteristics of the NFC technology are detected, and upon expiration of the wait duration.

13. The computer program product of claim 10, wherein the RF field is modulated by a tag talks first (TTF) device.

14. The computer program product of claim 13, wherein the NFC-enabled device is configured to detect the TTF device, and wherein the wait duration is a TTF device defined duration.

15. The computer program product of claim 10, wherein the wait duration is a guard time defined as part of the technology detection process.

16. The computer program product of claim 10, wherein the wait duration is selected as a longer duration of either a guard time defined as part of the technology detection process, or a TTF device defined duration.

17. The computer program product of claim 10, wherein the RF field is determined to be modulated when a load associated with the modulation characteristics of the NFC technology is above a threshold.

18. The computer program product of claim 10, wherein the computer-readable medium further comprise code for:
receiving data wherein at least a portion of the data is received prior to expiration of the wait duration;
processing the data; and
notifying an upper layer of the data.

19. An apparatus for communications, comprising:
means for generating, at a near field communication (NFC)-enabled device, a radio frequency (RF) field that is not modulated by the NFC-enabled device during a wait duration as part of a technology detection process;
means for monitoring, while generating the RF field that is not modulated and before generating a polling command, the RF field during the wait duration to detect RF field modulations received in response to the generated RF field that is not modulated;
means for determining whether, during the wait duration, any RF field modulations consistent with modulation characteristics of a NFC technology are detected;
means for terminating the technology detection process after an end of the wait duration; and
means for, after terminating the technology detection process, generating the polling command in response to no RF field modulation consistent with modulation characteristics of the NFC technology having been detected during the wait duration.

20. The apparatus of claim 19, further comprising:
means for continuing the technology detection process upon expiration of the wait duration.

21. The apparatus of claim 19, further comprising:
means for continuing the technology detection process upon a determination that no RF field modulations consistent with modulation characteristics of the NFC technology are detected, and upon expiration of the wait duration.

22. The apparatus of claim 19, wherein the RF field is modulated by a tag talks first (TTF) device.

23. The apparatus of claim 22, wherein the NFC-enabled device is configured to detect the TTF device, and wherein the wait duration is a TTF device defined duration.

24. The apparatus of claim 19, wherein the wait duration is a guard time defined as part of the technology detection process.

25. The apparatus of claim 19, wherein the wait duration is selected as a longer duration of either a guard time defined as part of the technology detection process, or a TTF device defined duration.

26. The apparatus of claim 19, wherein the RF field is determined to be modulated when a load associated with the modulation characteristics of the NFC technology is above a threshold.

27. The apparatus of claim 19, wherein the means for determining are further configured to:
receive data wherein at least a portion of the data is received prior to expiration of the wait duration;
process the data; and
notify an upper layer of the data.

28. An apparatus for near field communication (NFC) communications, comprising:
a transceiver;
a memory;
a processor coupled to the memory; and
a NFC technology detection module coupled to at least one of the memory or the processor and configured to:
generate a radio frequency (RF) field that is not modulated by a NFC-enabled device during a wait duration as part of a technology detection process;
while generating the RF field that is not modulated and before generating a polling command, monitor the generated RF field during the wait duration to detect RF field modulations received in response to the generated RF field that is not modulated;
determine whether, during the wait duration, any RF field modulations consistent with modulation characteristics of a NFC technology are detected;
terminate the technology detection process after an end of the wait duration; and
after terminating the technology detection process, generate the polling command in response to no RF field modulation consistent with modulation characteristics of the NFC technology having been detected during the wait duration.

29. The apparatus of claim 28, wherein the NFC technology detection module is further configured to:
continue the technology detection process upon expiration of the wait duration.

30. The apparatus of claim 28, wherein the NFC technology detection module is further configured to:
continue the technology detection process upon a determination that no RF field modulations consistent with modulation characteristics of the NFC technology are detected, and upon expiration of the wait duration.

31. The apparatus of claim 28, wherein the RF field is modulated by a tag talks first (TTF) device.

32. The apparatus of claim 28, wherein the NFC-enabled device is configured to detect the TTF device, and wherein the wait duration is a TTF device defined duration.

33. The apparatus of claim 28, wherein the wait duration is a guard time defined as part of the technology detection process.

34. The apparatus of claim 28, wherein the wait duration is selected as a longer duration of either a guard time defined as part of the technology detection process, or a TTF device defined duration.

35. The apparatus of claim 28, wherein the RF field is determined to be modulated when a load associated with the modulation characteristics of the NFC technology is above a threshold.

36. The apparatus of claim 28, wherein the NFC technology detection module is further configured to:
receive data wherein at least a portion of the data is received prior to expiration of the wait duration;
process the data; and
notify an upper layer of the data.

* * * * *